Aug. 8, 1950  W. HOPPE  2,518,011
LABEL FEEDING MECHANISM
Filed Nov. 22, 1946  8 Sheets-Sheet 1

Fig. 1.

INVENTOR
WILLIAM HOPPE
BY Chapin & Neal
ATTORNEYS

Aug. 8, 1950 W. HOPPE 2,518,011
LABEL FEEDING MECHANISM
Filed Nov. 22, 1946 8 Sheets-Sheet 2

INVENTOR
WILLIAM HOPPE
BY Chapin & Neal
ATTORNEYS

Aug. 8, 1950   W. HOPPE   2,518,011
LABEL FEEDING MECHANISM
Filed Nov. 22, 1946   8 Sheets-Sheet 3

Fig. 4.

INVENTOR
WILLIAM HOPPE
BY Chapin & Neal
ATTORNEYS

Aug. 8, 1950      W. HOPPE      2,518,011
LABEL FEEDING MECHANISM Filed Nov. 22, 1946      8 Sheets-Sheet 7

INVENTOR
*William Hoppe*
BY *Chapin & Neal*
ATTORNEYS

Aug. 8, 1950 — W. HOPPE — 2,518,011
LABEL FEEDING MECHANISM
Filed Nov. 22, 1946 — 8 Sheets-Sheet 8

INVENTOR
WILLIAM HOPPE
BY Chapin & Neal
ATTORNEYS

Patented Aug. 8, 1950

2,518,011

UNITED STATES PATENT OFFICE 2,518,011

LABEL FEEDING MECHANISM

William Hoppe, Longmeadow, Mass., assignor to National Bread Wrapping Machine Co., Springfield, Mass., a corporation of Massachusetts Application November 22, 1946, Serial No. 711,534

5 Claims. (Cl. 164—68)

1

This invention relates to an improved web feeding mechanism particularly adapted for feeding labels in strip form and for severing individual labels from the web in registration with predetermined indicia thereon.

One object of the invention is to provide such a mechanism in which the registration mechanism will be of great simplicity and will have practically complete freedom from trouble in operation. Another object is to improve prior methods of using a cut out portion of the web as a registration means by so correlating the conformation of the web and the structure of the feeding mechanism so that the cut out portion will have great effectiveness in registration and at the same time may add to the artistic quality of the design of the individual labels. A further object is to provide a mechanism of this general type in which the functions of intermittently feeding the web, stopping the web for registration, and severing individual labels is combined in two sets of feed rolls one of which carries the knife. Additional objects will appear from the following specification and claims.

Referring to the drawings.

The apparatus may be mounted on any suitable frame 1, which may be the frame of the discharge conveyor of a wrapping machine, and to which a standard 2 is bolted on which the various parts are carried. A label roll bracket 3 is bolted to this standard and carries at its end a cantilever arm 4 held against rotation by a set screw 5. A bracket 6 is secured to the arm 4 by a pin 7, and beyond this on the arm are successively a swinging arm 8, a freely rotatable sleeve 9, and a collar 10 which is pinned or screwed to the shaft so as to hold the other parts in place. Reel members 11 are secured to the sleeve by set screws 12 so as to be adaptable for receiving rolls of labels in web form. The outer reel member can be loosened and slid off the sleeve over the collar for replacement of the label roll. A spring 13 is stretched between a pin 14 on bracket 6 and a lower extension of the swinging arm 8, the motion of which is limited by an abutment 15 on the arm and a second pin 16 on bracket 6. A tensioning roll 17 is secured to the end of arm 8 to maintain the label web 18 under tension in the usual way.

Figure 1:
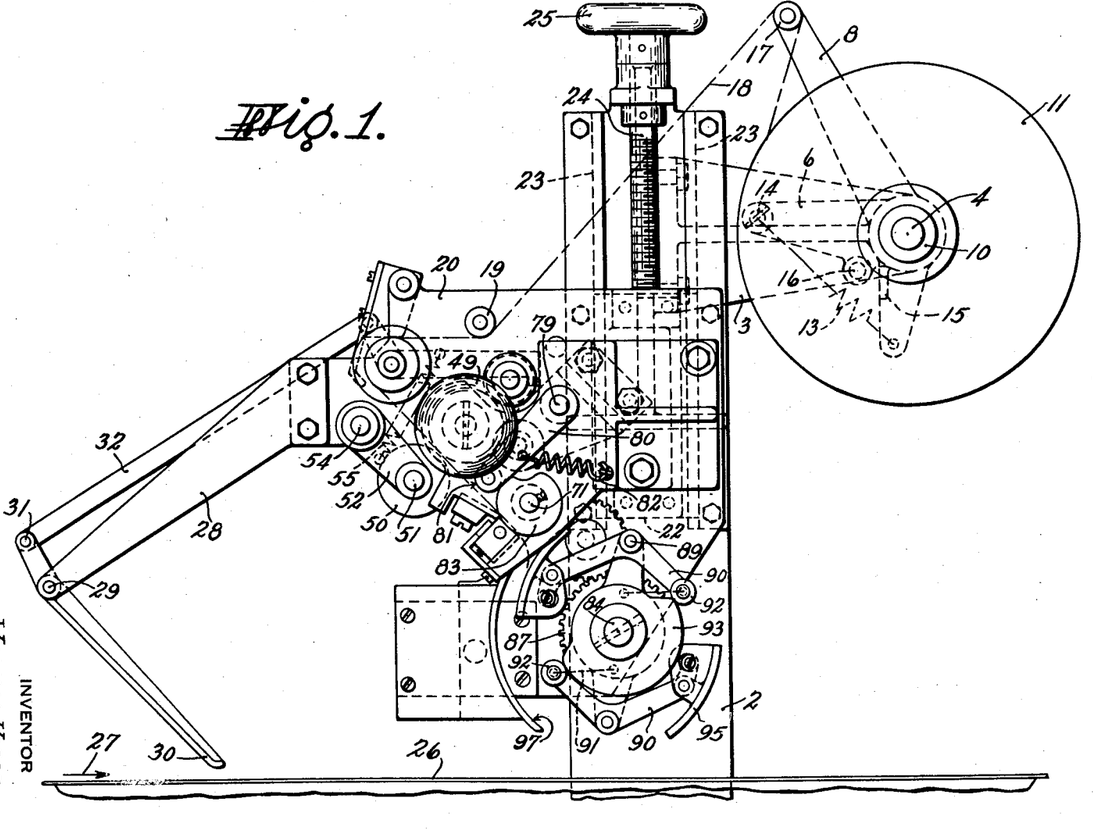
Fig. 1 is a side elevation of the label feeding and applying apparatus.
Figures 2, 3:
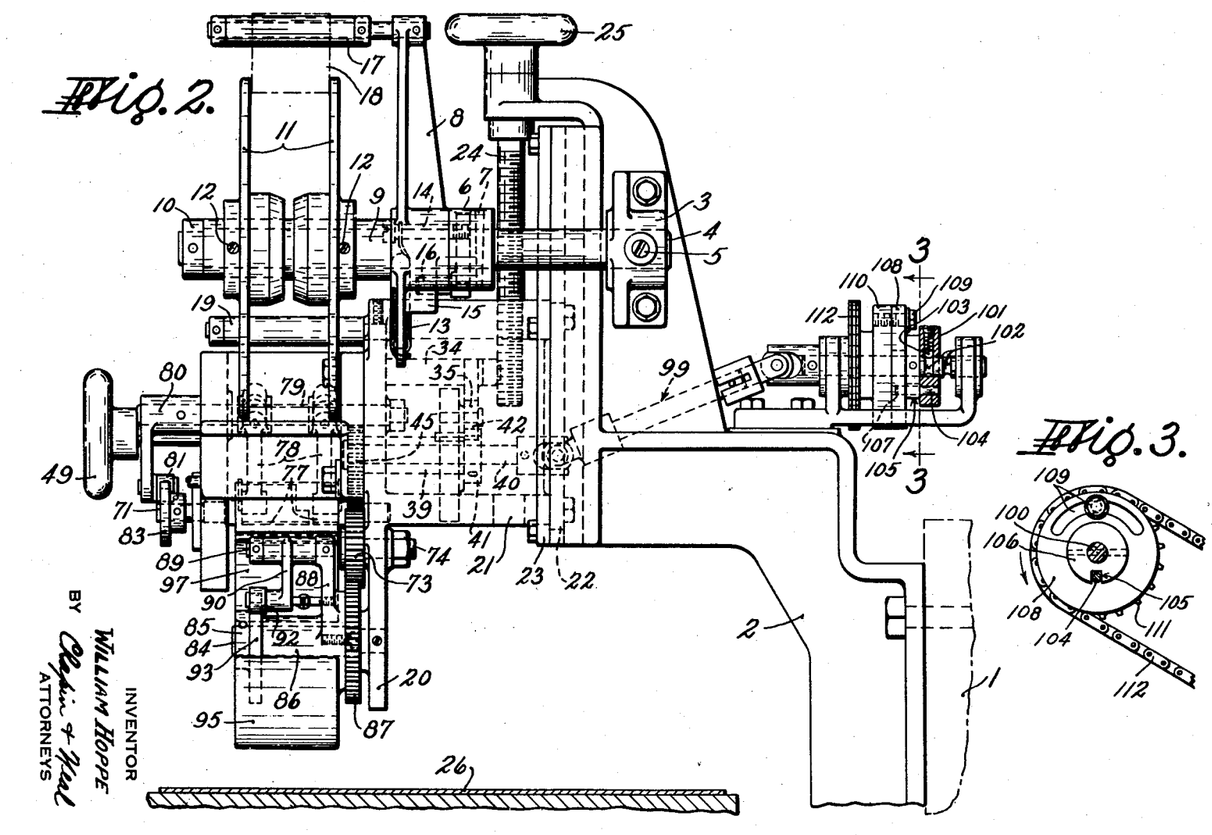
Fig. 2 is a front view thereof.
Fig. 3 is a section on line 3—3 of Fig. 2.

From the tensioning roll the web passes under a guide roll 19 on a frame 20 which is vertically adjustable in order to accommodate articles of differing height. The frame is fitted with an extension 21 (Fig. 2) having a plate 22 secured to it which rides in ways 23 on the standard 2. An adjusting screw 24 is secured against vertical motion in the standard and is threaded into the frame, the screw being provided with a hand wheel 25 which may be turned to raise or lower the frame. Also carried on frame 20 is a detecting mechanism which causes operation of the label feed only when an article is forwarded along the usual delivery belt 26 in the direction of the arrow 27 and which also times the label feed so as to centralize the label upon the article.

Figure 4:
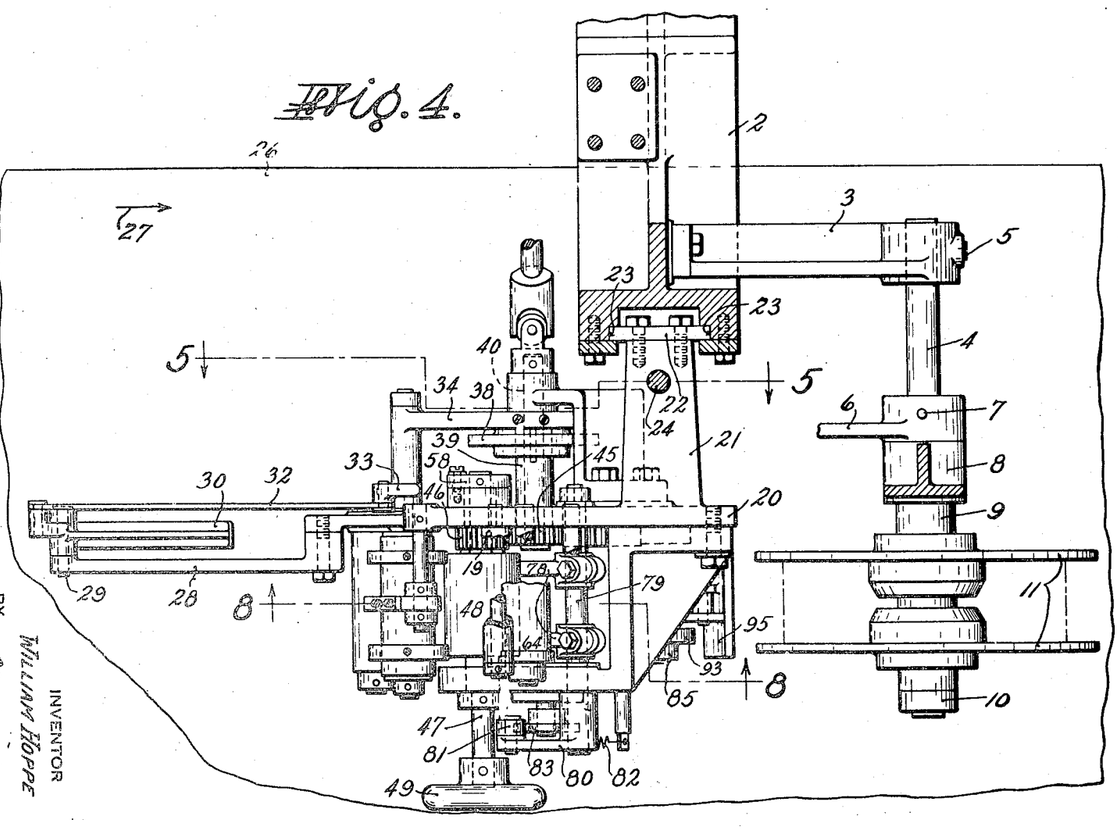
Fig. 4 is a top plan with some parts broken away.
Figure 5:
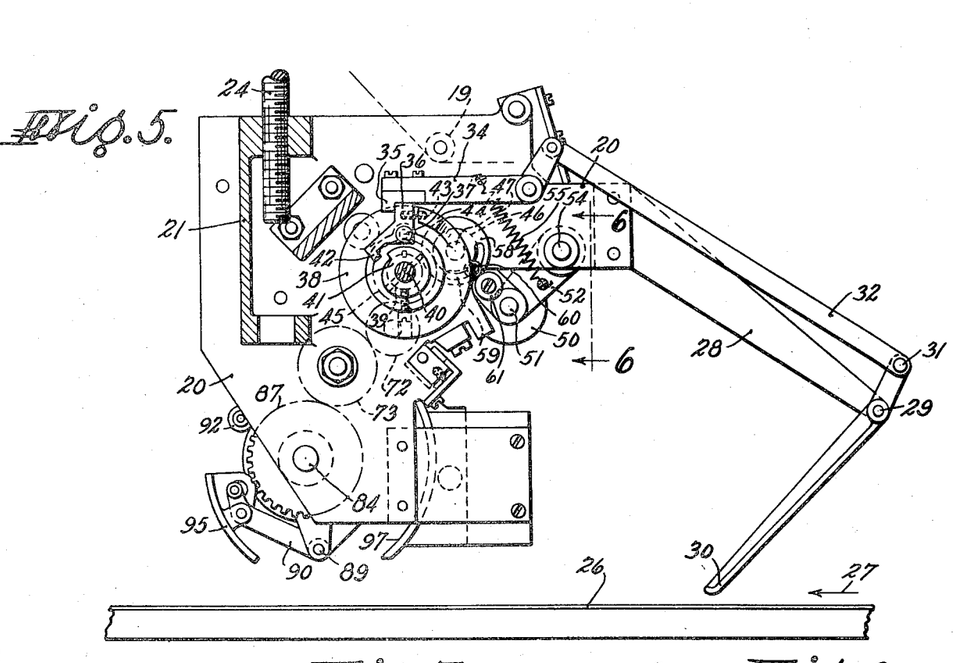
Fig. 5 is a section on line 5—5 of Fig. 4.
Figure 6:
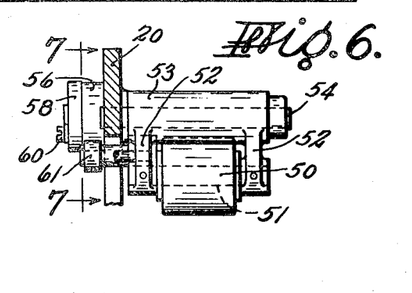
Fig. 6 is a section on line 6—6 of Fig. 5.
Figure 7:
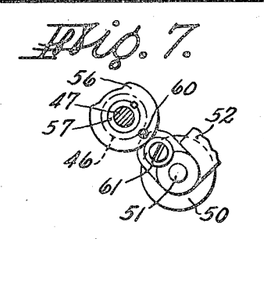
Fig. 7 is a section on line 7—7 of Fig. 6.

The detecting mechanism includes a bracket 28 extending laterally from frame 20 and having pivoted to it at 29 a feeler 30. The feeler is pivoted at 31 to a link 32 connected (Figs. 4 and 5) to an arm 33 of a lever 34 having an abutment 35 at its end. This abutment is adapted to engage the tail 36 of a pawl pivoted at 37 to a disk 38 carried by a sleeve 39 freely rotatable on a shaft 40. A one-tooth ratchet 41 is pinned to the shaft, which is driven in a manner to be described in timed relation to the delivery belt 26. Normally the nose 42 of the pawl is held out of engagement with the ratchet by engagement with the abutment 34, but when the feeler 30 is raised by the passage of an article under it the pawl is released to be forced into the path of the ratchet tooth by a spring 43 located between the tail of the pawl and a side extension 44 of the disk 38 to which the pawl is pivoted.

As stated above, the shaft 40 is driven in timed relation to the delivery of the wrapping machine to which the label applier is generally attached. The wrapping machine also delivers articles in timed relation so that they arrive under the feeler 30 in timed relation to the shaft 40 and consequently to the tooth of the ratchet 41. This timing can be varied as will be described so that the middle of the article rather than its leading edge will be in definite relation to the ratchet tooth. The disk 38 on which the pawl is carried is geared as will be described to the label feed, so that whenever the feeler is elevated by an article the label feed will be set in motion at such a time as will deposit the label centrally with respect to the center of the package. In general this time will not be the instant of contact between the leading edge of the package and the feeler, but will be such a predetermined interval after this as will be required for the ratchet tooth to rotate into contact with the then stationary pawl. The pawl, the disk 38, and the label feed driven from the latter, will thereupon rotate together until the tail of the pawl is engaged by the abutment 36, which has again been lowered by the passage of the package from under the feeler 30.

The sleeve 39 carries a gear 45 meshing with a gear 46 on a shaft 47. This shaft carries a hard surfaced web feed roll 48 and also a handwheel 49 by which the roll and the gear train connected with it may be rotated by hand when desired, as during the threading of a fresh label web into the machine. This feed roll has special features which can best be considered later. Cooperating with roll 48 is a soft surfaced feed roll 50 freely rotatable upon a shaft 51 carried by arms 52 on a sleeve 53 freely mounted for rotation upon a stationary stub shaft 54. The roll 50 is normally pressed towards the hard surface roll by a spring 55 (Fig. 5) and is periodically moved away from that roll by a cam 56 mounted on a sleeve 57 on the shaft 47. Fixed to that shaft adjacent the end of the sleeve is a collar 58 having an arcuate slot 59 through which a set screw 60 passes and is threaded into the cam. By this means the roll may be adjusted with relation to the cam to control their relative timing. The cam engages a cam roll 61 carried by the mounting for the soft roll 50 so that the latter will be moved toward and away from the hard roll in a manner to be described. Inset in the surface of the hard roll 48 is a block 62 carrying a printing surface 63 adapted to engage an inking roll 64 kept supplied with ink by a pad 65 and a doctor blade 66. The printing surface is used to impress any desired indicia on the label and is mounted to project slightly from the surface of the roll so that it may make contact with the soft roll even though the latter is moved away by the cam.

Below the feed rolls just described is a stationary cutter blade 67 with which cooperates a cutter blade 68 mounted as by set screws 69 on a combined cutter and feed roll 70. The latter roll is mounted on a shaft 71 on which is a gear 72 (Fig. 8) meshing with the gear 45 and also with a gear 73 on a shaft 74.

A freely rotatable soft roll 75 is pressed towards the cutter roll by a spring 76. The actual cutting is done by the blade 68 passing the stationary blade 67 and cutting or pinching off the label. As the rotating blade passes beyond the stationary blade it carries the trailing end of the severed label into contact with the rotating roll 75 so that the cut label is positively freed from the stationary blade. To free the leading edge of the label web from the blade 67 an oscillating paper guide 77 (Figs. 9 and 10) is mounted on the ends of arms 78 (see also Fig. 4) secured to a shaft 79. An arm 80 secured to the end of this shaft carries a cam roll 81 held by a spring 82 against a cam 83 on the shaft 71. As the paper guide is caused to move towards the edge of the stationary cutter blade by the cam it passes between that blade and the leading edge of the label web as in Fig. 10, thus freeing the web from any adhesion to the blade and permitting it to move forwardly without restriction upon the next succeeding feeding operation.

From the cutters the severed label may be applied to a package or a wrapper web as may be desired. Shown in the drawings is a preferred mechanism for so applying the labels according to a method described and claimed by me in my copending application for Letters Patent Serial No. 689,441, filed August 9, 1946, now Patent No. 2,449,298, issued September 14, 1948. A stud shaft 84 is secured as by pinning to the frame 20 and has a hub 85 integral with a cam pinned to the end of said stud shaft to retain rotatably a bearing sleeve 86 integral with a larger hub portion to which is secured a gear 87 which meshes with the gear 73 previously mentioned. Integral with said bearing sleeve 88 is a pair of arms 88 upon which are pivot studs 89 upon which a pair of rockers 90 are pivoted. These rockers are held by springs 91 so that a cam roll 92 on one end of each will remain in contact with a stationary cam 93 fixed upon the shaft 84. To a pivot stud 94 on each rocker is pivoted for limited rocking motion a shoe 95 having an eccentric and slot connection 96 with the rocker in order to facilitate adjustment to correspond to the contour of a concave shoe 97 which is kept hot by an electric heater 98.

Figure 8:
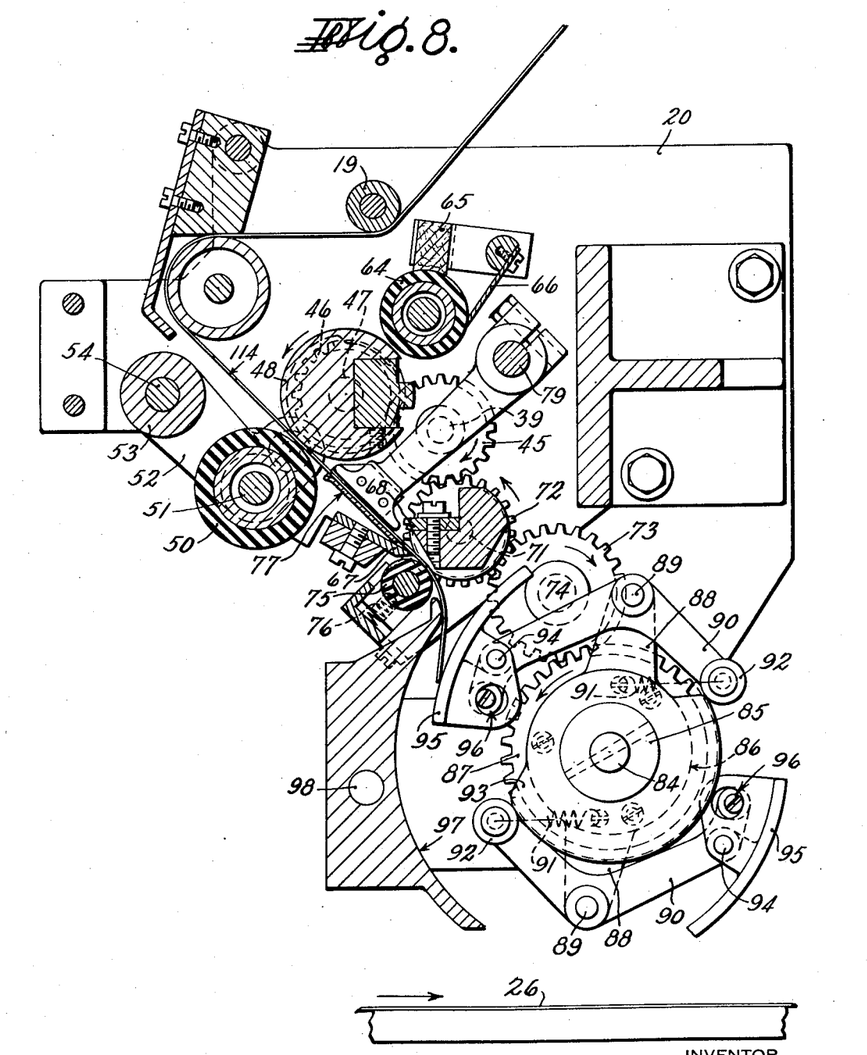
Fig. 8 is a partial section on line 8—8 of Fig. 4.

As the cut labels are delivered from the cutting mechanism they are timed to project between the concave shoe 97 and one of the shoes 95 as shown in Fig. 8. At this time the latter shoe is retracted by the cam 93 as shown in that figure. This retraction is for the purpose of allowing the end of the label to project well between the two shoes before being grasped between them by the cam roll 92 riding off the high part of the cam 93 and thus pressing the shoe 95 against the shoe 97. The label web is so fed into the machine that its thermoplastic side is toward the concave shoe, which is maintained at such a temperature that the thermoplastic is almost immediately rendered fluid. At the same time there will be formed on the surface of this shoe a thin film of molten thermoplastic which acts as a lubricant permitting the label to slide over it readily. For this reason no special mechanism is necessary to grasp the leading edge of the label, the friction between the shoe 95 and the label being so much greater than that between the label and the lubricated shoe 97 that the label will be carried through the heating mechanism without slippage.

The label, with the thermoplastic on its surface tacky or molten, is carried directly against the package or wrapper web to which it is to be applied with the molten surface in direct contact with the face of the package or wrapper. The thermoplastic will at once be chilled and solidified by contact with the article and will adhere to it without the necessity of using any special cooling apparatus. This is particularly true since it has not been necessary to use as great a degree of heat as in the customary heat sealing processes in which the heat to fuse the thermoplastic is applied to the opposite surface of the label, which must consequently be heated bodily to a sufficient temperature to transmit heat to the thermoplastic surface to fuse it. This requires a much higher degree of heat than where heat is applied directly to the thermoplastic surface itself.

It has been stated above that the label feeding mechanism is timed to start a predetermined time before the article reaches the label application point and that the exact amount of this interval could be varied to suit the dimensions of the package being dealt with so that the label would be applied to the exact center of the package. For this purpose the shaft 48 which carries the one-tooth ratchet 41 is connected (through a universal coupling drive 99) to a shaft 100 upon which is mounted a drive disc 101. The shaft 100 is provided with a pair of grooves 102 into which fits a spring pressed ball 103 carried by the drive disc, so that the latter may take one of two axially spaced positions. A drive pin 104 is secured to the drive disc, and projects laterally through a notch 105 in a drive collar 106 which is pinned to the shaft, and in one position of the disc 101 also projects into a hole 107 in a disc 108 adjustable angularly with respect to a face plate 110 by an arcuate bolt and slot connection 109. The face plate is integral with a sprocket 111 driven by a chain 112 from the delivery conveyor of the wrapping machine. By changing the angular adjustment the timing of the label applying mechanism with respect to the wrapping machine can be varied, so that the label will be fed out a controllable time after the leading edge of the article has made contact with the feeler 38. This permits accurate centralization of the label upon the adjacent face of the article. The permitted movement of the clutch disc 101 allows the label feed to be disengaged from the wrapping machine whenever it is not desired to apply labels to the wrapped articles, or when it is desired to operate the label feed by hand for testing and the like.

The operation of the mechanism described, and the method of registering the label web, will now be described.

Figures 9, 10:
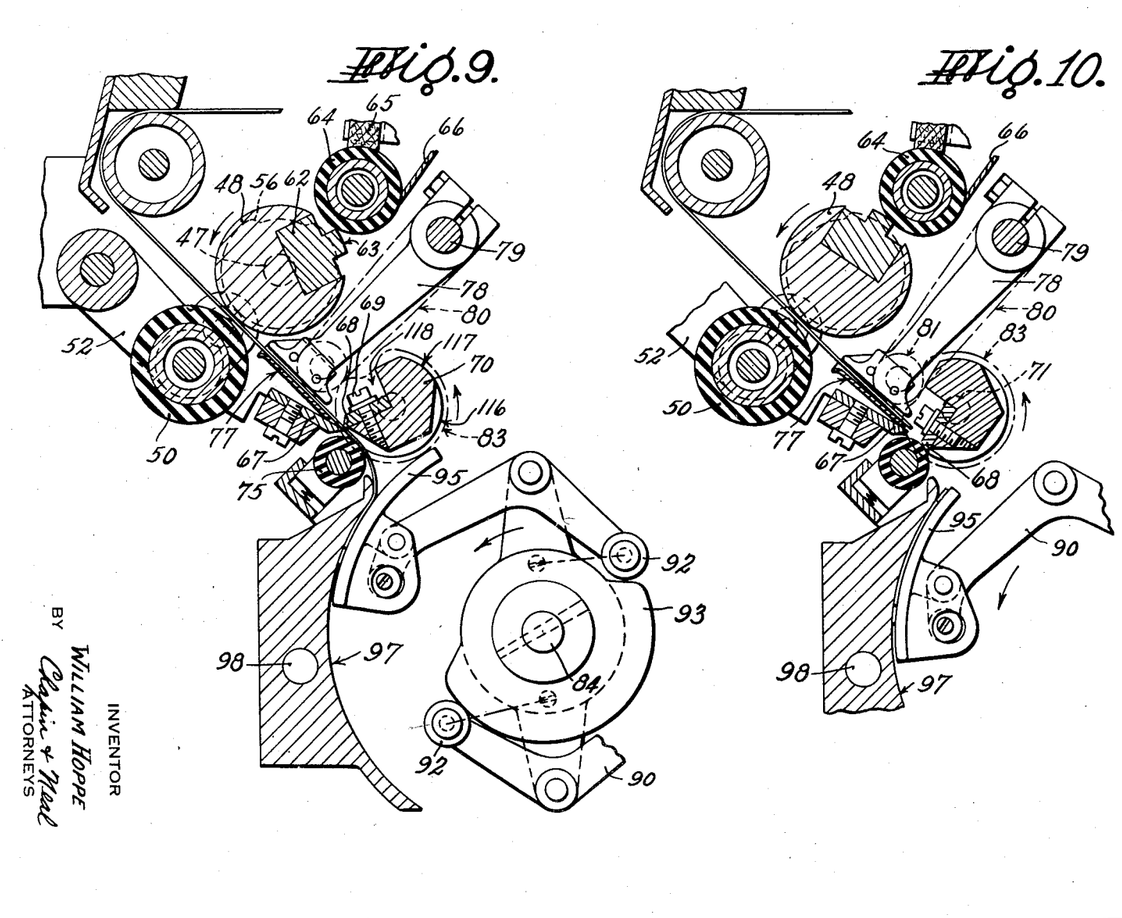
Figs. 9 to 14 are successive views generally similar to Fig. 8 but simplified to show successive stages in the feeding, cutting, heating and application of the label.
Figures 14, 15, 16, 17, 18, 19:
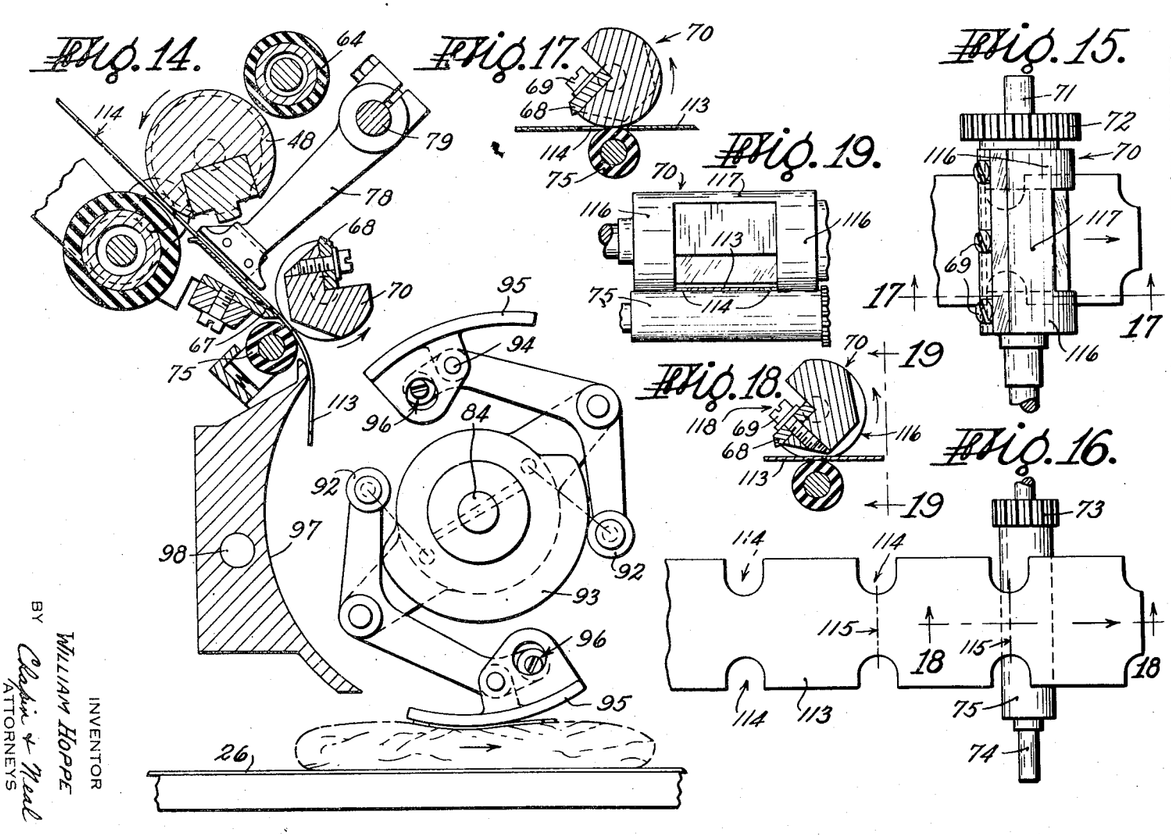
Fig. 15 is a detail of one of the label feeding rolls.
Fig. 16 is a similar view with one roll removed.
Fig. 17 is a section on line 17—17 of Fig. 15.
Fig. 18 is a section on line 18—18 of Fig. 16.
Fig. 19 is a view on line 19—19 of Fig. 18.

It will be convenient to start with the parts in the position of Fig. 9, in which the label is just being severed by passage of the rotating blade 68 past the stationary blade 67. At this time no feeding of the label web is occurring, since the feed rolls 48 and 50 are held separated by their actuating cam and the knife roll 70 is so constructed, as will be described, so that it will cooperate with the form of the label web so that the web is fed up to the proper position for cutting and is then stopped. The label web 113 is, as shown in Fig. 16, provided with marginal notches 114 and the lines of cut 115 of the individual labels are transversely of the web through the center of opposed pairs of these notches. The notches are preferably shaped so that they assist in forming a pleasing contour for the cut labels. At the same time these notches coact with the knife roll to produce a stoppage in the feeding of the web. The knife roll 70, besides carrying the blade 68, has marginal feeding surfaces 116 (Fig. 19) which are of less width than the notches and also has a solid portion 117 which presses the entire width of the web against the backing roll 75. This solid portion is of limited circumferential extent and is spaced from the knife blade at 118. In the position of Fig. 9 this space 118 is just coming opposite the backing roll. The marginal portions 116 being at this time within the notches 114 and the solid portion 117 not having reached the web no feeding of the web takes place.

Figures 11, 12, 13:
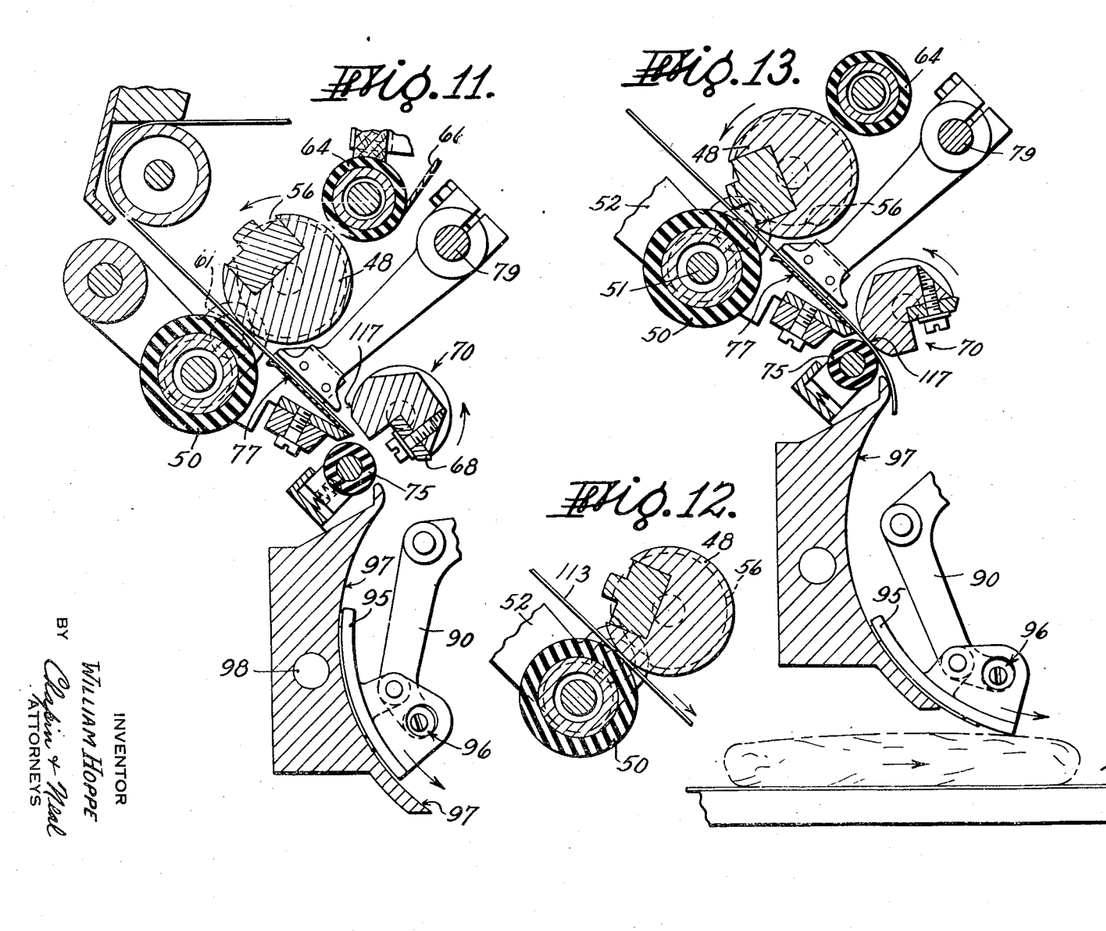

Just after the severance of the web the paper guide 77 moves forwardly a short distance (compare Figs. 9 and 10) sufficient to free the end of the web from the stationary knife 67 in case the thermoplastic coating of the web causes adhesion. The paper guide then moves rearwardly, leaving the web end free for further advance as in Fig. 11. As also shown in Fig. 11 cam roll 61 is about ready to move into the low part of cam 56 and allow the soft roll 50 to approach the continuously rotating hard feed roll 48 as shown in Fig. 12 to cause feeding of the leading end of the web sufficiently to project it between the knife roll 70 and the backing roll 75. It will be noted on the drawing (Fig. 11) that a completely cut away portion of knife roll 70 is in proper timed relation to allow the free projection of the leading end of said web between rolls 70 and 75. After the solid portion 117 of the knife roll comes into position to press the web against the backing roll (Fig. 13) the cam 56 separates rolls 48 and 50 so that feeding is continued by the solid portion of the knife roll and subsequently by its marginal portions 116 until the latter again pass into a pair of opposed notches 114 as shown in Figs. 17, 18 and 19, when feeding stops in such a position as will be correct for severance of the web by the knife. At approximately the time when the label is cut the severed label is grasped between a shoe 95 and the concave shoe 97, (Fig. 9) heated, and applied to the article to be labeled.

Printing of the label is accomplished by the printing surface 63 when this passes the soft roll 50. The position of the printed area relative to the label may be controlled as desired by the adjustment 59 previously described.

I claim:

1. A web feeding and severing device for webs having regularly spaced marginal indentations which web is to be severed at said indentations comprising a knife carrying roll having a knife, means to drive said roll, said roll being provided with relatively narrow circumferentially extending marginal feeding portions only over a portion of its surface immediately ahead of the knife and provided with a central feeding portion over another portion of its surface following the knife, and a backing roll abutting said feeding portions of said knife carrying roll whereby the web which is fed between the knife carrying roll and the backing roll is gripped and fed by said marginal feeding portions until said marginal feeding portions engage said indentations at which time the knife severs the web in predetermined relation to said indentations and said following central feeding portion causes the web to be again forwarded after the action of the knife, irrespective of the presence of said marginal indentations between the said knife carrying roll and backing roll.

2. A web feeding and severing device for webs having regularly spaced marginal indentations comprising a knife carrying roll having a knife, means to drive said roll, said roll being provided with relatively narrow circumferentially extending marginal feeding portions only over a portion of its surface immediately ahead of the knife and provided with a central feeding portion over another portion of its surface following and spaced from the knife, the portion of the knife carrying roll between said central feeding portion and the knife being reduced to provide a non-feeding portion, a backing roll abutting said knife carrying roll whereby the web which is fed between the latter roll and the backing roll is gripped and fed by said marginal feeding portions until said marginal feeding portions engage said indentations at which time the knife severs the web in predetermined relation to said indentations, a pair of feed rolls for advancing the web between said knife carrying roll and said backing roll during the passage of said non-feeding portion of the surface of the knife carrying roll over the backing roll, means to drive one of said pair of rolls, and means to separate said pair of rolls as the web is engaged by said central feeding portion of the knife carrying roll whereby the web is again advanced by the knife carrying roll and the backing roll irrespective of the presence of said indentations between the knife carrying roll and backing roll.

3. A web feeding and severing device for webs having regularly spaced marginal indentations comprising a knife carrying roll having a knife, means to drive said roll, said roll being provided with relatively narrow circumferentially extending marginal feeding portions only over a portion of its surface immediately ahead of the knife and provided with a central feeding portion over another portion of its surface following and spaced from the knife, the portion of the knife carrying roll between said central feeding portion and the knife being reduced to provide a non-feeding portion, a backing roll abutting said knife carrying roll whereby the web which is fed between the latter roll and the backing roll is gripped and fed by said marginal feeding portions until said marginal feeding portions engage said indentations at which time the knife severs the web in predetermined relation to said indentations, a pair of feed rolls for advancing the web between said knife carrying roll and said backing roll during the passage of said non-feeding portion of the surface of the knife carrying roll over the backing roll, means to drive one of said pair of rolls, and a cam to separate said pair of rolls when the web has been advanced to a position for engagement by said central feeding portion of the knife carrying roll whereby the web is again advanced by the knife carrying roll and the backing roll irrespective of the presence of said indentations between the knife carrying roll and backing roll, said cam being adjustable to vary the length of web fed by said pair of rolls during the non-feeding portion of the rotation of the knife carrying web prior to the engagement of the web by said central feeding portion.

4. A web feeding and severing device for webs having regularly spaced longitudinally aligned cut away portions which web is to be severed in predetermined relation to said cut away portions, comprising a knife carrying roll having a knife, means to drive said roll, said roll being provided with relatively narrow circumferentially extending feeding portions only over a portion of its surface, said narrow feeding portions being positioned immediately ahead of the knife and in the path of the cut away portions of the web, another portion of the surface of said roll following the knife being provided with a feeding portion offset from the path of the cut away portions of the web, and a backing roll abutting said feeding portions of the knife carrying roll whereby the web which is fed between the knife carrying roll and the backing roll is gripped and fed by said narrow feeding portions until said narrow feeding portions engage said cut away portions at which time the knife severs the web in predetermined relation to said cut away portions and said following offset feeding portion causes the web to be again forwarded after the action of the knife, irrespective of the presence of said cut away portions between the knife carrying roll and backing roll.

5. A web feeding and severing device for webs having regularly spaced longitudinally aligned cut away portions, which web is to be severed in predetermined relation to said cut away portions, comprising a knife carrying roll having a knife, means to drive said roll, said roll being provided with relatively narrow circumferentially extending feeding portions only over a portion of its surface, said narrow feeding portions being positioned immediately ahead of the knife and in the path of the cut away portions of the web, another portion of the surface of said roll following the knife being provided with a feeding portion offset from the path of the cut away portion of the web, the portion of the knife carrying roll between said offset feeding portion and the knife being reduced to provide a non-feeding portion, a backing roll abutting said feeding portions of the knife carrying roll whereby the web which is fed between the latter roll and the backing roll is gripped and fed by said narrow feeding portions until said narrow feeding portions engage said cut away portions at which time the knife severs the web in predetermined relation to said cut away portions, a pair of feed rolls for advancing the web between said knife carrying roll and said backing roll during the passage of said non-feeding portion of the surface of the knife carrying roll over the backing roll, means to drive one of said pair of rolls, and means to separate said pair of rolls when the web is engaged by said offset feeding portion of the knife carrying roll whereby the web is again advanced by the knife carrying roll and the backing roll irrespective of the presence of said cut away portions between the knife carrying roll and backing roll.

WILLIAM HOPPE.

REFERENCES CITED

The following references are of record in the file of this patent:

UNITED STATES PATENTS

| Number | Name | Date |
|---|---|---|
| 346,592 | Landfear | Aug. 3, 1886 |
| 2,041,831 | Helsel | May 26, 1936 |
| 2,321,057 | Weiss | June 8, 1943 |